US010169596B2

(12) United States Patent
Fuse

(10) Patent No.: US 10,169,596 B2
(45) Date of Patent: Jan. 1, 2019

(54) INFORMATION PROCESSING APPARATUS, METHOD, AND STORAGE MEDIUM

(71) Applicant: CANON KABUSHIKI KAISHA, Tokyo (JP)

(72) Inventor: Hiroshi Fuse, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 15/201,262

(22) Filed: Jul. 1, 2016

(65) Prior Publication Data

US 2017/0011224 A1    Jan. 12, 2017

(30) Foreign Application Priority Data

Jul. 9, 2015 (JP) .................. 2015-138116

(51) Int. Cl.
| | |
|---|---|
| *H04L 29/06* | (2006.01) |
| *G06F 21/62* | (2013.01) |
| *G06F 21/10* | (2013.01) |
| *G06F 21/12* | (2013.01) |
| *G06F 21/44* | (2013.01) |

(52) U.S. Cl.
CPC ........ *G06F 21/6209* (2013.01); *G06F 21/105* (2013.01); *G06F 21/12* (2013.01); *G06F 21/44* (2013.01); *G06F 2221/0777* (2013.01)

(58) Field of Classification Search
None
See application file for complete search history.

(56) References Cited

U.S. PATENT DOCUMENTS

| | | | | |
|---|---|---|---|---|
| 8,224,750 B1* | 7/2012 | Bennett | .................. | G06F 21/10 |
| | | | | 705/51 |
| 2002/0065780 A1* | 5/2002 | Barritz | .................... | G06F 21/10 |
| | | | | 705/59 |
| 2002/0194010 A1* | 12/2002 | Bergler | .................. | G06Q 10/10 |
| | | | | 705/310 |
| 2005/0149759 A1* | 7/2005 | Vishwanath | .......... | G06F 21/121 |
| | | | | 726/4 |
| 2007/0288389 A1* | 12/2007 | Vaughan | ................. | G06F 21/10 |
| | | | | 705/59 |
| 2009/0228982 A1* | 9/2009 | Kobayashi | .............. | G06F 21/10 |
| | | | | 726/26 |
| 2011/0162080 A1* | 6/2011 | Hayami | ................ | G06F 21/105 |
| | | | | 726/26 |
| 2011/0307958 A1* | 12/2011 | Ashton | ................. | G06F 21/105 |
| | | | | 726/26 |
| 2012/0110198 A1* | 5/2012 | Sasaki | ................... | G06F 21/105 |
| | | | | 709/229 |
| 2014/0047506 A1* | 2/2014 | Yabe | ..................... | G06F 21/105 |
| | | | | 726/3 |

FOREIGN PATENT DOCUMENTS

JP    2011-138335 A    7/2011

* cited by examiner

*Primary Examiner* — Shin-Hon (Eric) Chen
(74) *Attorney, Agent, or Firm* — Canon USA Inc., IP Division

(57) ABSTRACT

An information processing apparatus carries out license return at the same time as carrying out license activation and returns only a license that can bring about a beneficial effect by being returned according to a state of a held license. Further, if a plurality of licenses is associated with a single serial number, the information processing apparatus returns the plurality of licenses collectively.

9 Claims, 12 Drawing Sheets

FIG.6

| SERIAL NUMBER | SOFTWARE NAME | SOFTWARE VERSION | SOFTWARE IDENTIFICATION INFORMATION | SOFTWARE UPGRADE CODE | CLIENT DEVICE INFORMATION | SOFTWARE RELEASE DATE | MAINTENANCE TERM | ACTIVATION STATE OF LICENSE |
|---|---|---|---|---|---|---|---|---|
| 1111-1111-1111-0001 | SOFTWARE 100 | 1 | C100 | {11111111-FFFF-FFFF-FFFF-FFFF11111111} | 0000AAAA2222 | JANUARY 1, 2012 | START ON JANUARY 1, 2012 END ON DECEMBER 31, 2014 | ACTIVATED |
| 1111-1111-1111-0001 | SOFTWARE 400 | 4 | C400 | {11111111-FFFF-FFFF-FFFF-FFFF11111111} | 0000AAAA2222 | JULY 1, 2014 | START ON JANUARY 1, 2012 END ON DECEMBER 31, 2014 | ACTIVATED |
| 5555-5555-5555-0001 | SOFTWARE 500 | 5 | C500 | {11111111-FFFF-FFFF-FFFF-FFFF11111111} | — | JANUARY 1, 2015 | START ON JANUARY 1, 2015 END ON DECEMBER 31, 2017 | NOT ACTIVATED |
| 1111-PPPP-PPPP-0000 | SOFTWARE EXTENDED FUNCTION 100 | 1 | C100P | {77777777-AAAA-AAAA-AAAA-AAAA77777777} | 0000AAAA2222 | JANUARY 1, 2012 | START ON JANUARY 1, 2012 END ON DECEMBER 31, 2014 | ACTIVATED |
| 1111-PPPP-PPPP-0001 | SOFTWARE EXTENDED FUNCTION 100 | 1 | C100P | {77777777-AAAA-AAAA-AAAA-AAAA77777777} | — | JANUARY 1, 2012 | START ON JANUARY 1, 2012 END ON DECEMBER 31, 2014 | NOT ACTIVATED |
| 5555-5555-5555-0001 | SOFTWARE EXTENDED FUNCTION 500 | 5 | C500P | {77777777-AAAA-AAAA-AAAA-AAAA77777777} | — | JANUARY 1, 2015 | START ON JANUARY 1, 2015 END ON DECEMBER 31, 2017 | NOT ACTIVATED |
| 5555-PPPP-PPPP-0001 | SOFTWARE EXTENDED FUNCTION 500 | 5 | C500P | {77777777-AAAA-AAAA-AAAA-AAAA77777777} | — | JANUARY 1, 2015 | START ON JANUARY 1, 2015 END ON DECEMBER 31, 2017 | NOT ACTIVATED |

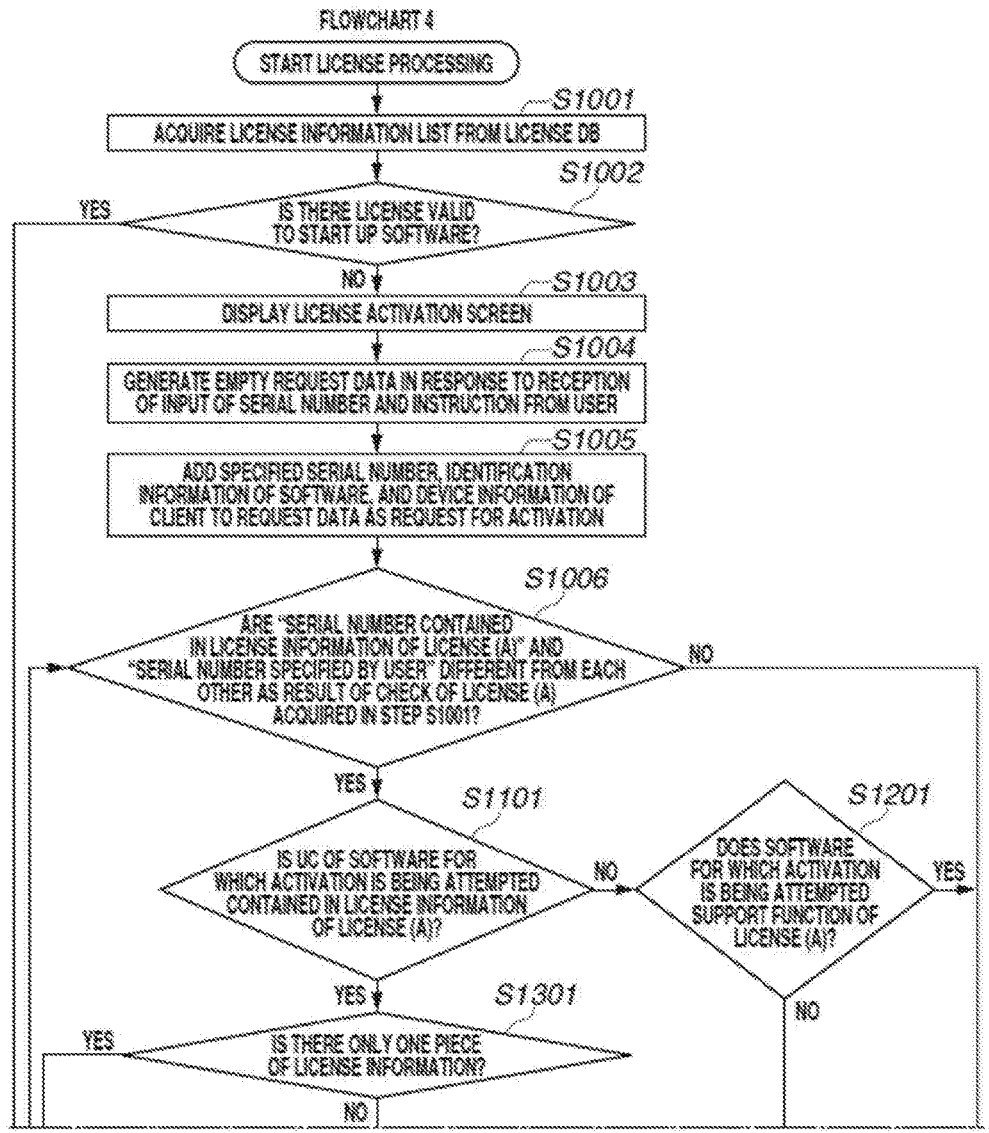

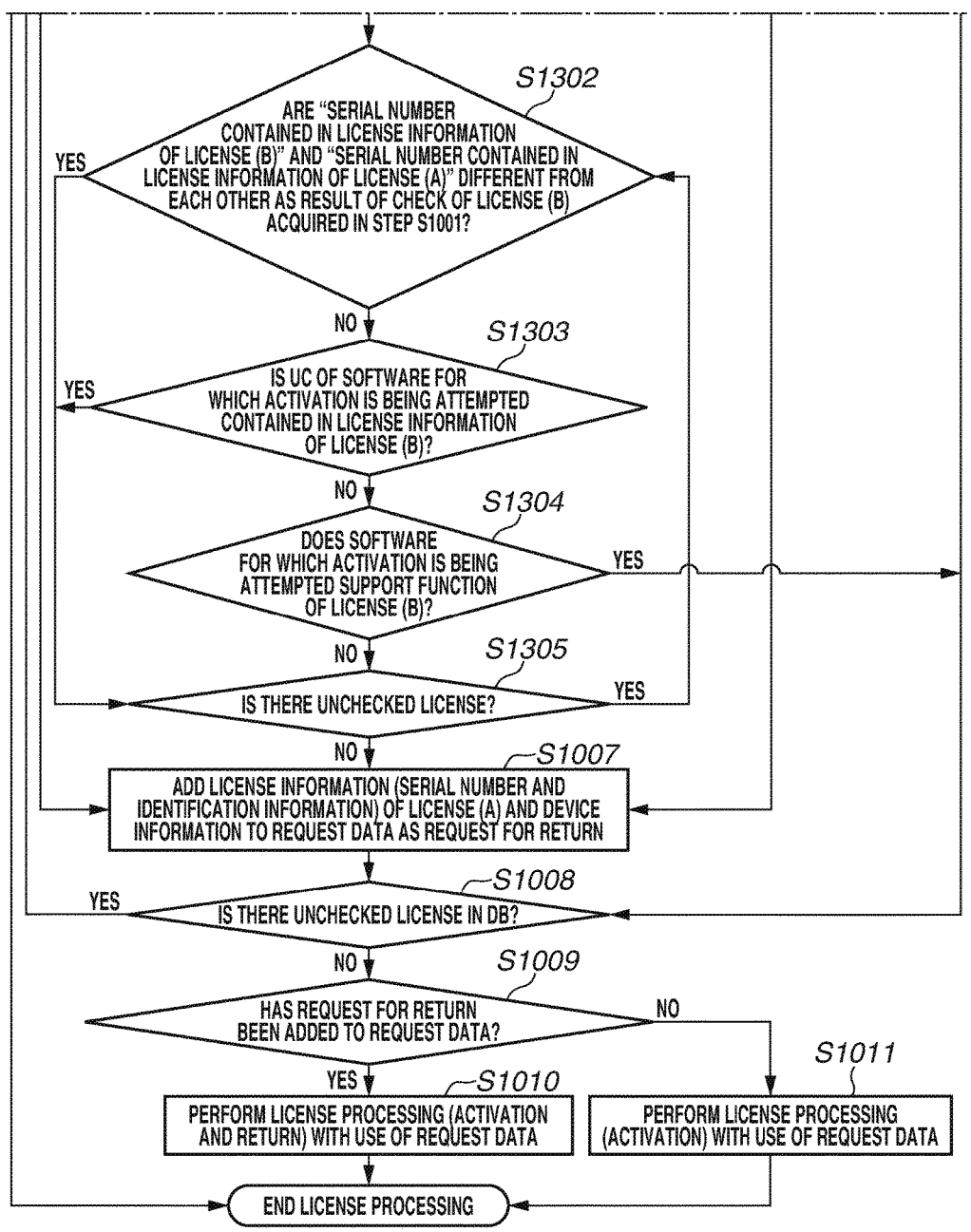

INFORMATION PROCESSING APPARATUS, METHOD, AND STORAGE MEDIUM

BACKGROUND OF THE INVENTION

Field of the Invention

The present invention relates to an information processing apparatus, a method, and a storage medium for controlling an operation of software based on a license.

Description of the Related Art

Methods for licensing commercial software include a node-locked method. Now, an activation flow according to the node-locked method will be described specifically. First, a user inputs a serial number, and transmits the input serial number together with identification information of software and device information of a computer to a licensing server. Next, the licensing server determines whether to be able to carry out license activation by comparing the information transmitted from the user with a database for managing a license. When the license activation is carried out by the licensing server, a license only usable on the above-described computer is issued. Further, the licensing server associates the above-described plurality of pieces of information used in the license activation with the serial number as license activation information, and manages them on the above-described database. This management with the serial number associated with the license activation information enables the node-locked method to prohibit another computer from using the serial number managed by the licensing server in association with the license activation information. Lastly, the computer acquires the license issued by the licensing server, and stores the acquired license into a database for storing the license in the computer. The software determines whether the license is stored, thereby determining whether to permit a startup of the software.

Further, Japanese Patent Application Laid-Open No. 2011-138335 proposes a technique for returning the license to be stopped using when the software is uninstalled. Japanese Patent Application Laid-Open No. 2011-138335 discusses the technique that detects whether there is the license for the software to be uninstalled and returns the license at the same time as the uninstallation if there is the license, when the software is uninstalled. According to this technique, the license stopped using is returned at the time of the uninstallation, whereby the pieces of information (the serial number, the identification information of the software, and the device information of the computer) associated with the license by the licensing server are released. As a result, the serial number released from the association with the license activation information becomes usable on another computer.

SUMMARY OF THE INVENTION

According to an aspect of the present invention, an information processing apparatus configured to control an operation of software based on an issued license, includes a holding unit configured to hold a serial number input to issue a first license for controlling the operation of the software, a reception unit configured to receive an input of a serial number required to issue a second license for controlling the operation of the software at a different version, a checking unit configured to check whether the serial number corresponding to the first license held by the holding unit and the serial number received by the reception unit are different from each other, and a control unit configured to control the software based on the second license issued by a licensing server based on the serial number received by the reception unit along with returning the first license to the licensing server, if the checking unit confirms that the serial number corresponding to the first license held by the holding unit and the serial number received by the reception unit are different.

Further features of the present invention will become apparent from the following description of exemplary embodiments with reference to the attached drawings.

BRIEF DESCRIPTION OF THE DRAWINGS

FIG. 6 illustrates a license table owned by a license management unit.

FIGS. 11A & 11B are flowcharts illustrating processing according to an exemplary embodiment of the present invention.

DESCRIPTION OF THE EMBODIMENTS

Figure 1:
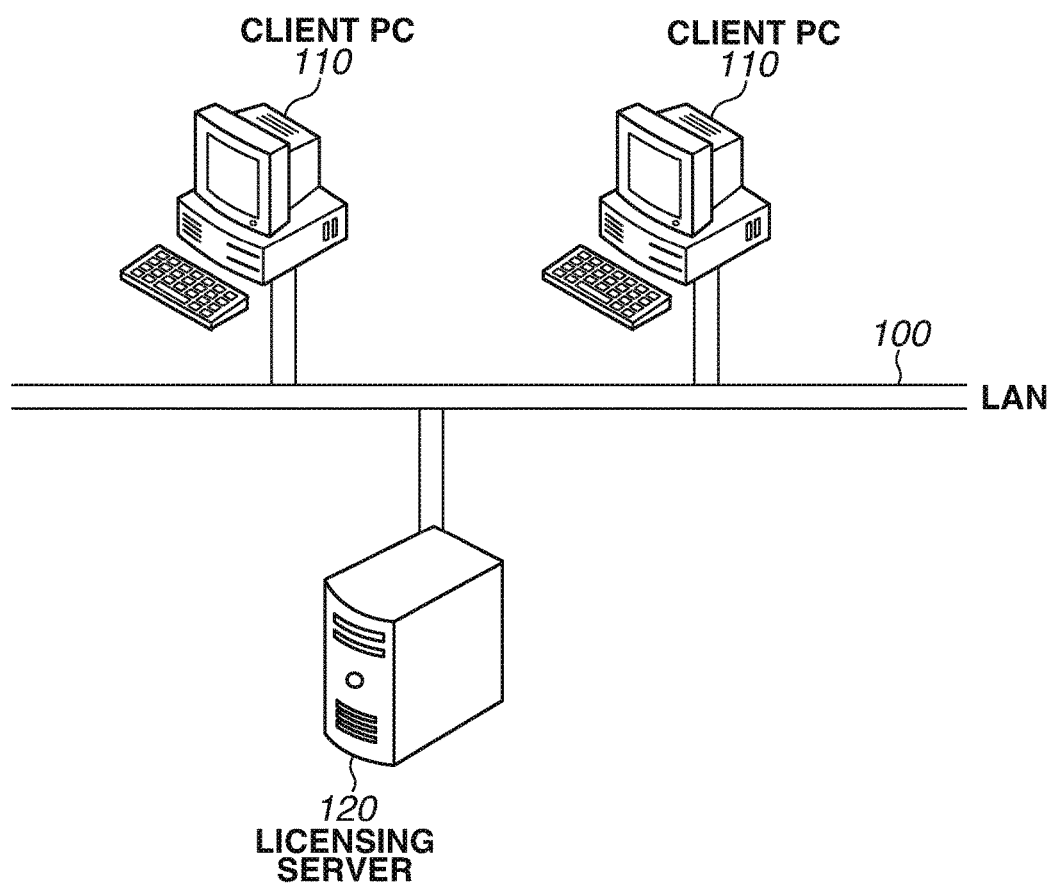
FIG. 1 illustrates a configuration of a system.

If a configuration that issues the license with a plurality of licenses associated with a single serial number is introduced in a licensing system, the employment of the license return technique discussed in Japanese Patent Application Laid-Open No. 2011-138335 may cause a problem. This is such a problem that, if the plurality of licenses is associated with the single serial number, the serial number cannot be used on another computer unless all of the licenses associated with the serial number are returned and the respective associations of the pieces of license information are released. The present invention is directed to a technique capable of solving the above-described problem by returning only a license that can bring about a beneficial effect by being returned.

First, circumstances under which the present invention is assumed to be applied will be described. In the present invention, the license corresponding to each of software applications at different versions can be issued based on the single serial number. More specifically, the issue of the license proceeds according to a flow that will be described below. If a user attempts to acquire the license by inputting a serial number valid for three years, the licensing server determines whether this serial number is within its expiration date. If the licensing server determines that the serial number is within its expiration date, the user can acquire licenses for all of software applications released within the expiration date of the serial number with use of the same serial number for free. In other words, if software applications at a plurality of versions are released within three years, the user can acquire all of the licenses for the software applications released during this time period. Further, a range of licenses acquirable with use of the single serial number according to the present technique is not limited to within the same software, but the single serial number may also be applicable to an additional function (e.g., a plug-in) appended to the software and even completely different software. Further, the software and the versions corresponding to the license acquirable with use of the serial number are managed by the licensing server.

Further, the identification information of the software is used in the determination about whether to permit the startup of the software and the management of the version of the software. For example, regarding the determination about whether to permit the startup of the software, the startup of the software is permitted if the same identification information as the software is defined in the acquired license. Further, regarding the management of the version of the software, for example, the identification information is managed in such a manner that "the identification information is changed for a significant revision of the software (a major version upgrade) and is not changed for a slight revision of the software (a minor version upgrade)". According to this management, the identification information is not changed for the software upgraded as the minor version upgrade after the license is acquired, whereby the user can continue to use the software at a new version with use of the license acquired from the licensing server before the upgrade. In other words, the user who has used the software at an old version can use the software at the new version for free. On the other hand, if the identification information of the software is changed, no license having the same identification information as the software at the new version is stored in the license database of the computer, whereby the user should input the serial number again and acquire the license from the licensing server. Acquiring the license again from the licensing server in this state results in the computer associated with two licenses for the software at the old version and the software at the new version.

Then, the license for the new version is used for the upgraded software, so that the license for the old version is no longer necessary. In other words, upgrading the software may lead to the not-used license remaining in the computer.

In the following description, representative exemplary embodiments for embodying the present invention will be described with reference to the drawings.

[System Configuration]

FIG. 1 illustrates a configuration of a data processing system according to a first exemplary embodiment of the present invention. The present exemplary embodiment is a system in which a client and a licensing server described below are communicable with each other via a network.

In the present exemplary embodiment, a client 110 is a computer used by a user who instructs the client 110 to request a license to a licensing server 120. The client 110 is assumed to be managed by the licensing server 120 based on a node-locked license. The client 110 acquires a license to be used by software 300 or a software extended function 304 installed in the client 110 from the licensing server 120, and controls an operation of this software 300 or software extended function 304. The licensing server 120 is a management apparatus that manages the license used by the software 300 or the software extended function 304 installed in the client 110 (license management). The license is an example of specific information regarding the use of the software 300 or the software extended function 304. Further, the client 110 can use the software 300 or the software extended function 304 by acquiring the license from the licensing server 120.

The client 110 and the licensing server 120 are connected to a local area network (LAN) 100, and each of the computers reciprocally communicates information via the LAN 100. The system according to the present exemplary embodiment may be configured in such a manner that the client 110 and the licensing server 120 included therein are connected to each other via an arbitrary network other than the LAN 100.

[Hardware Configuration (Client and Licensing Server)]

Figure 2:
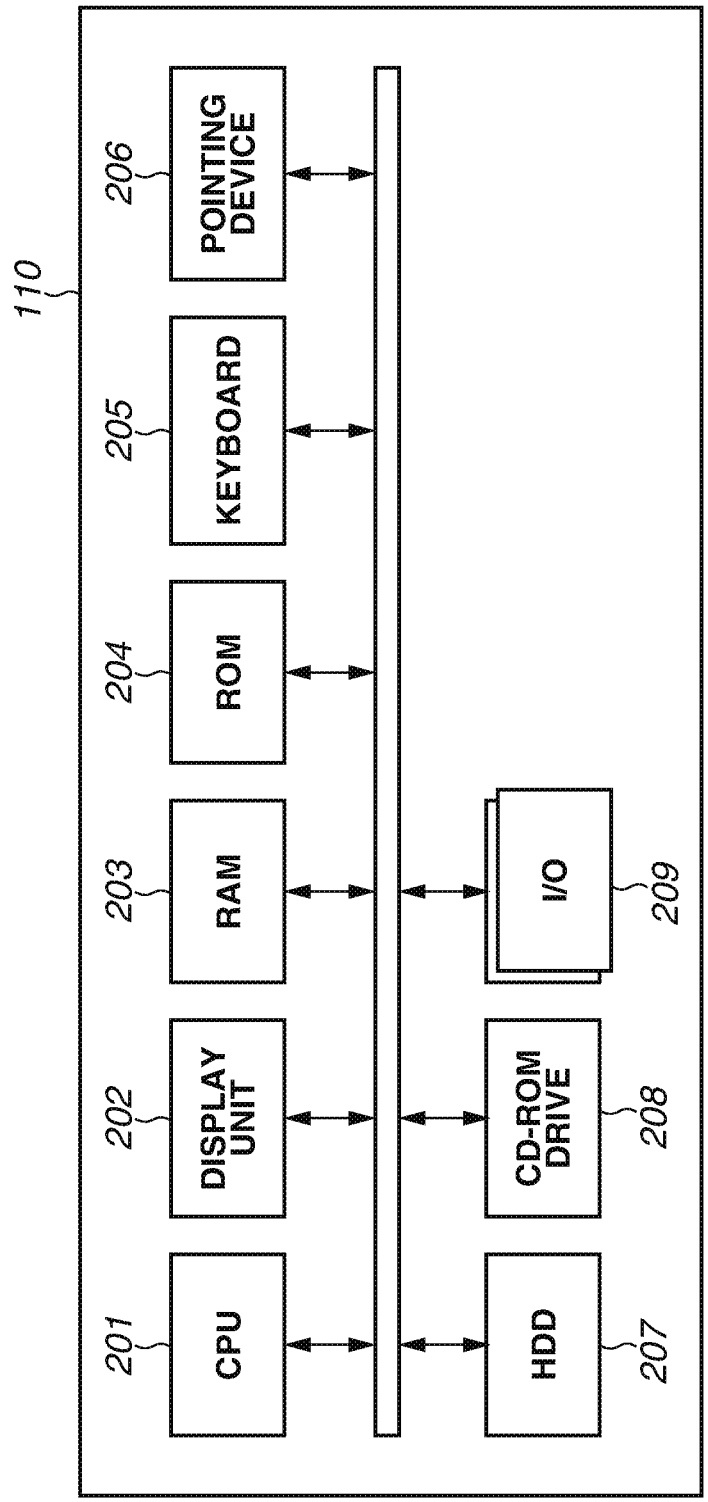
FIG. 2 is a block diagram illustrating a hardware configuration of each of a client and a licensing server.

FIG. 2 illustrates a hardware configuration of each of the client 110 and the licensing server 120. Each of the client 110 and the licensing server 120 includes a keyboard 205 and a pointing device 206, which are input devices that receive an input of a user operation. The keyboard 205 is a device that inputs information such as a character and a number to the client 110 or the licensing server 120. The keyboard 205 includes, for example, a key for inputting a Japanese kana character, an alphabet, and the like, a numerical keypad for inputting the number, various kinds of functional keys, a cursor key, and other keys. The keyboard 205 inputs, for example, a serial number to be transmitted to the server 120 according to the user's operation.

The pointing device 206 includes, for example, a mouse. If operating the client 110 with use of a graphical user interface (GUI) or the like, the user can input predetermined information by clicking a button, an icon, or the like displayed on a display device with the mouse. For example, when the client 110 displays an icon representing installed software on a display unit 202 and the user clicks this icon with the mouse, a central processing unit (CPU) 201 starts up the software according thereto. Further, each of the client 110 and the licensing server 120 includes the display unit 202 that feeds back visual output information to the user.

The display unit 202 displays various kinds of information on a screen including, for example, a cathode ray tube (CRT) display, a liquid crystal display, or a plasma display. The display unit 202 displays a result of the input from the keyboard 205 or the mouse, a screen provided by the software (for example, a user interface), and the like.

Figure 3:
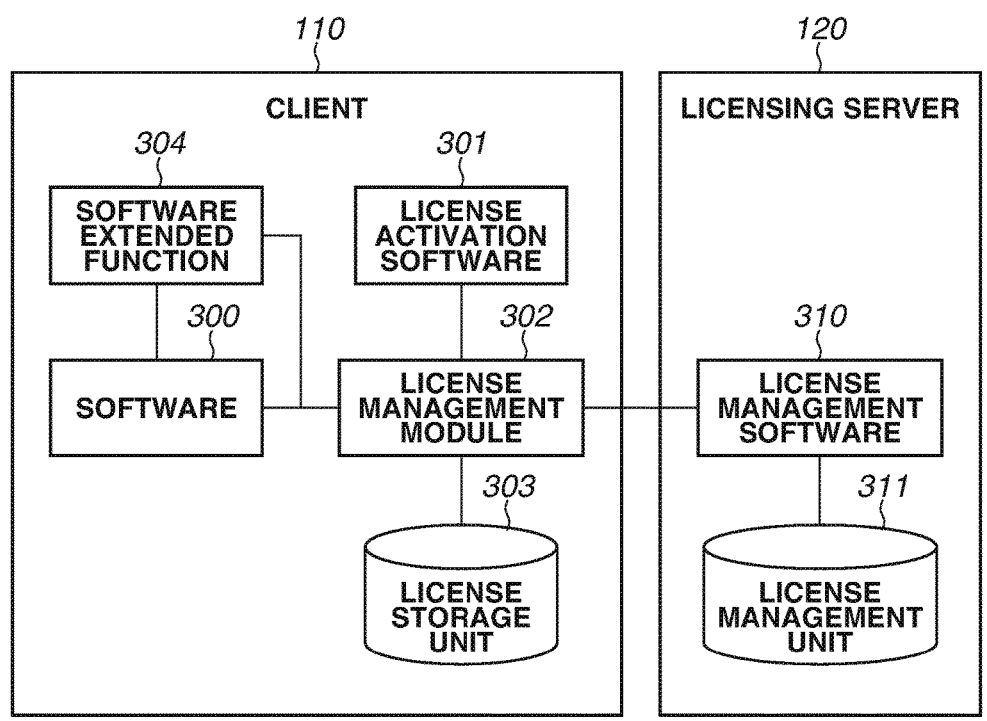
FIG. 3 is a block diagram illustrating respective software configurations of the client and the licensing server.

Further, each of the client 110 and the licensing server 120 includes the CPU 201, which is a unit for controlling an operation, a random access memory (RAM) 203, a read only memory (ROM) 204, and a hard disk drive (HDD) 207. As an operation specific to the present exemplary embodiment, the CPU 201 realizes functions of the software 300, license activation software 301, a license management module 302, and the software extended function 304, which are illustrated in FIG. 3, on the client 110. On the other hand, the CPU 201 realizes a function of license management software 310 illustrated in FIG. 3 on the licensing server 120. The CPU 201 executes each software application stored into a memory by being installed into the client 110 or the licensing server 120, and performs various kinds of calculations, information processing, and processing for controlling the entire client 110 or the entire licensing server 120 according to a predetermined program.

The RAM 203, the ROM 204, and the HDD 207 store various kinds of programs and information about execution according to the present exemplary embodiment. Further, each of the client 110 and the licensing server 120 also includes a compact disk-read only memory (CD-ROM) driver 208 for reading out data recorded in a compact disk (CD). An operating system (OS) and other control programs including a control program for realizing the present exemplary embodiment are loaded into the RAM 203 by the CPU 201 to be then executed by the CPU 201. Further, the RAM 203 functions as various kinds of work areas and an area where data to be used to execute the control program is temporarily saved. In the present exemplary embodiment, an area that the CPU 201 uses to, for example, acquire the license and start up the software 300 is prepared in the RAM 203. The ROM 204 is a storage device that stores various kinds of control programs that perform various kinds of control by the CPU 201, data, parameters, and the like.

The HDD 207 includes a readable and writable storage medium, and a driving device for reading and writing a program and data out of and into this storage medium. In the present exemplary embodiment, the HDD 207 is a local disk including a hard disk. The storage medium included in the HDD 207 may be a magneto-optical disk, a magnetic disk, a semiconductor memory, or the like. The HDD 207 stores the software 300, the license activation software 301, the license management module 302, a license storage unit 303, and the software extended function 304, or the license management software 310 and a license management unit 311, which are illustrated in FIG. 3. Further, the HDD 207 stores a communication program that controls an interface device input/output (I/O) 209 to maintain the communication via the network. Further, the HDD 207 stores, for example, the OS, which is basic software for causing a client such as memory management and file input/output management to operate.

Further, each of the client 110 and the licensing server 120 includes the interface device I/O 209 that communicates with an external apparatus, and includes the CPU 201 that executes the program. How the client 110 and the licensing server 120 are connected to respective peripheral devices may be any of a wired connection and a wireless connection. The interface device I/O 209 is connected to a client and various kinds of server apparatuses (a web server, a mail server, and the like) via the network (for example, the LAN 100 or the Internet). If the communication is carried out via the Internet, for example, a protocol such as Transmission Control Protocol/Internet Protocol (TCP/IP) is used. The interface device I/O 209 establishes and maintains the communication between the client 110 and the licensing server 120, and receives the license to be used by the software 300 from the licensing server 120. In the present exemplary embodiment, the client 110 communicates with the licensing server 120 via this interface device I/O 209. The program stored in the ROM 204 or the HDD 207 is loaded into the RAM 203, and is executed by the CPU 201, by which processing that will be described in the present exemplary embodiment is realized.

[Software Configuration (Client and Licensing Server)]

FIG. 3 illustrates an example of respective software configurations of the client 110 and the licensing server 120. FIG. 3 illustrates processing units regarding processing for managing the license that are included in the client 110 and the licensing server 120.

First, each of the components included in the client 110 will be described. The client 110 includes the software 300, the license activation software 301, the license management module 302, the license storage unit 303, and the software extended function 304. In FIG. 3, the software 300, the license activation software 301, the license management module 302, and the license storage unit 303 are assumed to be installed in the client 110 by a software installer. Further, the software extended function 304 is assumed to be installed in the client 110 by a software extended function installer.

The software 300 may be any software, such as word processor software, spreadsheet software, database software, image editing software, and editor software. The license activation software 301 may be software such as a license activation screen illustrated in FIG. 4 that receives an input of the serial number.

The license management module 302 has a function for overall processing regarding the license in the client 110. The license management module 302 functions as a use management unit that requests and acquires the specific information (license information) regarding the use of the software 300 to and from the licensing server 120 illustrated in FIG. 1, and manages the use of the software 300. The license management module 302 generates request data for the license processing upon receiving a request from the license activation software 301 as an execution target, and adds information required for the license activation to the above-described request data. The information required for the license activation is identification information of the software 300, device information of the client 110, and the serial number. The license management module 302 transmits the request data to the licensing server 120 after adding these pieces of information as the data for the license activation. The request data is data for transmitting and receiving information about the processing regarding the license that is performed in the client 110 and the licensing server 120. The request data contains therein information such as the above-described identification information of the software 300, the above-described device information of the client 110, and the above-described serial number. The device information is information for uniquely identifying the computer of the client 110, and for example, a media access control (MAC) address corresponds thereto. The serial number is a number uniquely assigned to a package of the software 300, and is a number required when the client 110 requests the licensing server 120 to issue the license. Further, the license management module 302 receives the license issued by the licensing server 120, and stores this license into the license storage unit 303.

The license storage unit 303 is a database storing information regarding the license acquired from the license management software 310 (a license table, details of which will be described below with reference to FIG. 5). Information associated with the license is managed in the license storage unit 303, and examples thereof include a name of the software 300, a version of the software 300, the identification information of the software 300, the device information of the client 110, the serial number, and an upgrade code of the software 300. These pieces of information are used in a determination about whether to permit a startup of the software 300, and processing for determining whether to return the license at the time of the license activation. Further, when the license is returned, the information associated with the returned license is deleted from the license storage unit 303 by the license management module 302.

The software extended function 304 refers to, for example, an optional function such as a plug-in addable to the software 300. Generally, the extended function does not operate by itself, and does not function unless there is the software 300 that is a main body. Further, in the present exemplary embodiment, the software extended function 304 is assumed not to function unless a license for the software extended function 304 is acquired. The software extended function 304 performs similar processing regarding the license to the software 300 via the license management module 302, whereby descriptions regarding the similar processing and functions will be omitted here.

Next, each of the components included in the licensing server 120 will be described. The licensing server 120 includes the license management software 310 and the license management unit 311. In the example illustrated in FIG. 3, the license management software 310 and the license management unit 311 are assumed to be installed in the licensing server 120 by a license management software installer.

The license management software 310 has a integrated function regarding the license management. The license management software 310 transmits and receives the information regarding the license to and from the client 110. Further, the license management software 310 functions as a license manager that issues the license and changes an activation state of the license based on the information (the request data) received from the client 110, and manages the license for the software 300 or the software extended function 304. Further, the license management software 310 transmits the issued license to the client 110.

The license management unit 311 is a database storing the information regarding the license managed by the license management software 310 (a license table, details of which will be described below with reference to FIG. 6). The activation state of the license is managed in the license management unit 311, in addition to similar information to that in the license storage unit 303.

Further, the license management software 310 updates the license information managed in the license management unit 311 when the license activation or the license return is carried out by the license management software 310. When updating the license information according to the license activation, the license management software 310 associates the information contained in the request data with the license. Updating the license information according to the license activation means updating the license into a currently used state with respect to the software 300 or the software extended function 304 installed in the client 110 that is a target of the above-described license. On the other hand, when updating the license information according to the license return, the license management software 310 deletes the information associated with the license. Updating the license information according to the license return is accompanied by a release of the information indicating the serial number and the device information of the client 110 associated with the license, thereby allowing the license activation to be carried out with use of the serial number associated with the above-described returned license on another computer.

Each of the units illustrated in FIG. 3, which performs the processing that will be described in the present exemplary embodiment, is realized by the CPU 201 loading the program stored in the ROM 204 or the HDD 207 into the RAM 203 and executing the loaded program.

[UI Screen of License Activation Software]

Figure 4:
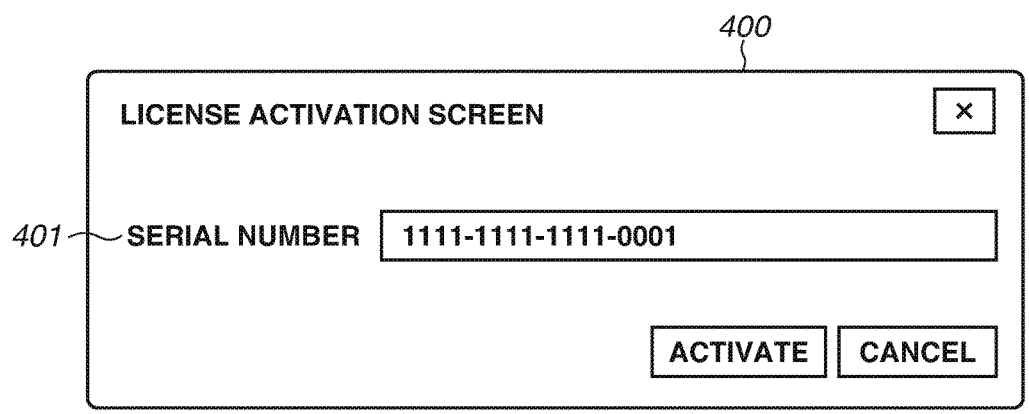
FIG. 4 illustrates a user interface (UI) screen of license activation software.

FIG. 4 illustrates a GUI of the license activation software 301. A license activation screen 400 includes a text box for the user to input a serial number 401, and the license activation software 301 receives the input serial number 401. The serial number 401 is used when the client 110 acquires the license from the licensing server 120.

[License Table Owned by License Storage Unit]

Figure 5:
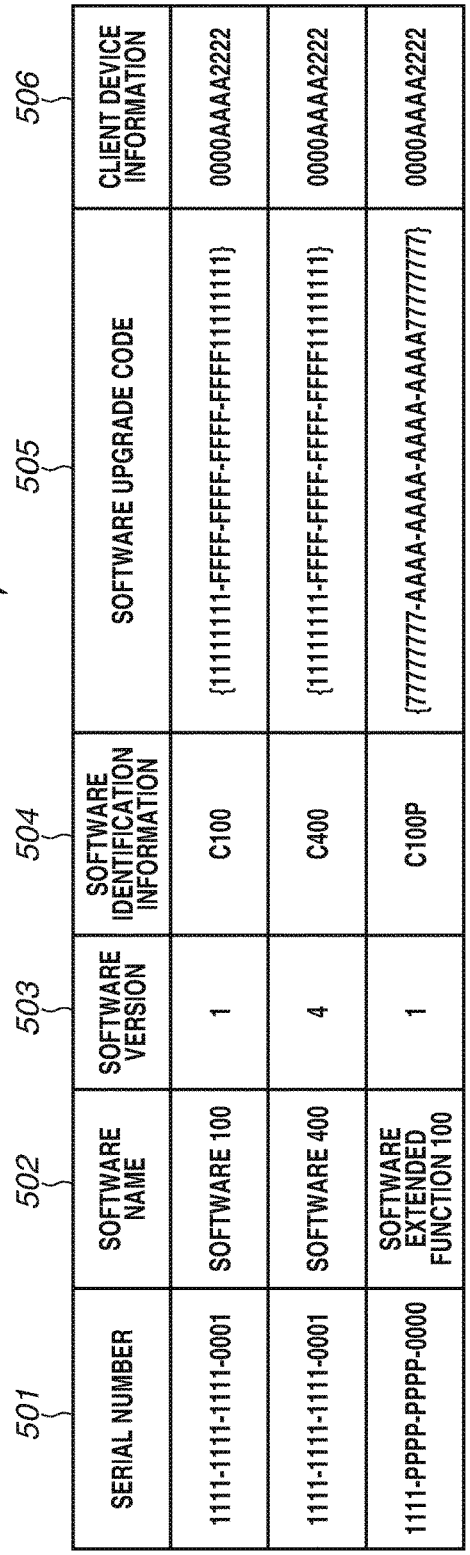
FIG. 5 illustrates a license table owned by a license storage unit.

FIG. 5 illustrates the license table managed in the license storage unit 303. The license table 500 manages the information associated with the license acquired by the license management module 302. A serial number 501 is the same number as the serial number 401 specified on the license activation software 301. In FIG. 5, two software applications, i.e., software 100 and software 400 are associated with a single serial number 401 (1111-1111-1111-0001). This means that the license activation is carried out for the two software applications 300 with use of the single serial number.

Pieces of information 502 to 506 about the software 300 (or the software extended function 304) are contained in the license information. The software name 502 is the name of the software 300, and the version 503 is the version of the software 300. The software identification information 504 is used to carry out management of the license based on the version with respect to the software 300. For example, the management of the license based on the version is assumed to be carried out in such a manner that, when versions 1, 2, 3, and 4 of the software 300 are released in this order, the versions 2 and 3 are provided for free to the user who has purchased the version 1.

To realize this management of the license based on the version, the same identification information as the software identification information 504 (C100) defined in the version 1 is also defined in the versions 2 and 3. The license is defined in this manner by the license management software 310. Details of the definition of the license will be described below with reference to FIG. 6. Whether to permit the startup of the software 300 is determined based on whether there is the software identification information 504 embedded in the software 300 in the license information stored in the license storage unit 303. In other words, the license management module 302 determines whether the license information associated with the software identification information 504 (C100) is stored in the license storage unit 303, thereby determining whether to permit the startup of the software 300 at the versions 2 and 3. Therefore, as long as the license associated with the software identification information 504 (C100) is acquired for the software 300 at the version 1 from the licensing server 120 as illustrated in FIG. 5, the software applications 300 at the versions 2 and 3 can be started up even without the license activation carried out therefor.

The software upgrade code 505 is the upgrade code of the software 300, and is used in a determination regarding license processing in second to fourth exemplary embodiments, which will be described below. The client device information 506 is the device information of the client 110. In FIG. 5, the client device information 506 is defined by using the MAC address of the client 110 as that. In the present exemplary embodiment, the structure of the license table 500 has been described referring to the pieces of information 501 to 506 as examples of items therein, but the structure of the license table 500 is not limited to the above-described items.

[License Table Owned by License Management Unit]

FIG. 6 illustrates the license table owned by the license management unit 311. A license table 600 manages the license issued by the license management software 310.

Pieces of information 601 to 606 illustrated in FIG. 6 correspond to the pieces of information 501 to 506 illustrated in FIG. 5, respectively. In the present exemplary embodiment, FIG. 6 will be described, omitting descriptions about portions overlapping FIG. 5. The client device information 606 is the device information of the client 110. This device information 606 is stored when the client 110 acquires the license, and deleted when the client 110 returns the license. Further, the storage of the client device information 606 therein means that the serial number 601 associated with this information is currently in use, whereby this serial number 601 cannot be used on another computer. On the other hand, absence of the client device information 606 therein means that the serial number 601 associated with this information is currently out of use, whereby this serial number 601 can be used on another computer. However, if a plurality of pieces of client device information 606 is associated with the same serial number 601, this serial number 601 cannot be used on another computer unless all of the pieces of client device information 606 associated with the serial number 601 are deleted. Further, the client device information 606 is contained in the request data transmitted from the license management module 302 and received by the license management software 310 as one of the pieces of information for the license processing.

A software release date 607 is a date when the software 300 is released. A maintenance term 608 is a maintenance term of the serial number 601. A start date and an end date of the maintenance term are stored in the maintenance term 608, and the licenses can be acquired for a plurality of software applications 300 released within this time period with use of the single serial number. In FIG. 6, for example, the maintenance term 608 of the serial number 601 "1111-1111-1111-0001" is defined to be a time period from Jan. 1, 2012 to Dec. 31, 2014. This means that the licenses can be acquired for the software 100 and the software 400 released within this maintenance term with use of the single serial number. On the other hand, the software release date 607 of software 500 is defined to be Jan. 1, 2015, which makes the software 500 software released outside the maintenance term, whereby the license cannot be acquired for the software 500 with use of the serial number 1111-1111-1111-0001.

In the case where the licenses are acquired for the plurality of software applications (the software 100 and the software 400) on the single client 110 (device information 0000AAAA2222) with use of the single serial number 601 (1111-1111-1111-0001) in this manner, the license return faces the following problem. For example, if the license for the software 100 is returned in this state, the client device information 606 (0000AAAA2222) associated with the software 100 is deleted. At this time, the client device information 606 associated with the software 100 is empty, but 0000AAAA2222 remains stored in the client device information 606 of the software 400 associated with the same serial number 601 (1111-1111-1111-0001). A condition that makes the serial number 601 valid on another computer is deletion of all of the pieces of client device information 606 associated with the serial number 601. Therefore, the license for the software 400 should be further returned and the client device information 606 (0000AAAA2222) associated with the software 400 should be deleted to allow the serial number 601 (1111-1111-1111-0001) to be use on another computer. In the present exemplary embodiment, the structure of the license table 600 has been described by referring to the pieces of information 601 to 608 as examples of items therein, but the structure of the license table 600 is not limited to the above-described items.

[Registry Information of Software]

Figure 7:
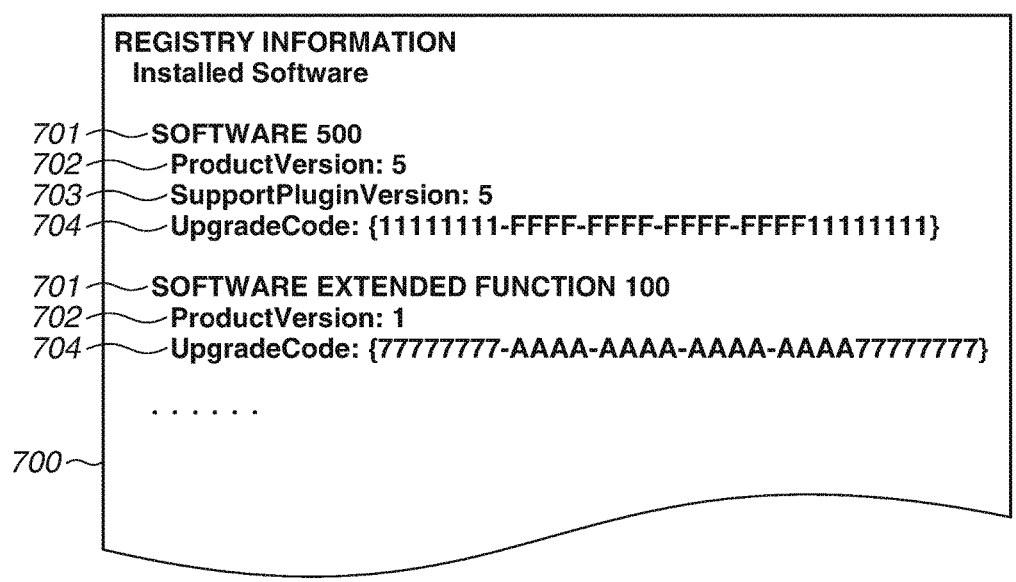
FIG. 7 illustrates registry information of software.

FIG. 7 illustrates registry information 700 of the client 110. The registry information 700 indicates a registry information list of the client 110, and holds information about the software 300 (the software extended function 304) installed in the client 110. For example, the registry information 700 holds a software name 701, a version 702 and a supported plug-in version 703, an upgrade code 704, and the like. In the present exemplary embodiment, this registry information 700 is assumed to be written into a registry of the OS when the software 300 is installed.

The software name 701 indicates the name of the software 300. The version 702 indicates the version of the software 300. The supported plug-in version 703 indicates the version of the software extended function 304 supported by the software 300. Further, the supported plug-in version 703 is an item held only for the software 300, whereby this item is not prepared for the software extended function 304. The upgrade code 704 (hereinbelow, referred to as the UC) is information uniquely set to the software 300, and the same information is used for the same software applications 300 even if the versions thereof are different from each other. In other words, the software applications 300 having the same UCs 704 as each other mean that they are the same software applications 300 at different versions, while the software applications 300 having the different UCs 704 from each other mean that they are different software applications 300 from each other. The information used to identify what product the software 300 is, like the UC 704, will be referred to as product information. A plurality of software applications 300 are treated as the same software applications 300 by being provided with common product information.

In the present exemplary embodiment, the registry information 700 has been described citing each of the pieces of information illustrated in FIG. 7 as an example thereof, but how the registry information 700 is written and expressed is not limited to this exemplary writing. Further, the pieces of written information and the locations including them are also not limited to the example illustrated in FIG. 7.

[Processing of Software According to First Exemplary Embodiment]

In a case where the software 300 is such software that only one version is permitted to be installed in the client 110, the license for the software 300 at the old version is unnecessary if the client 110 holds the license for the software 300 at the new version. Further, in a case where the license activation is carried out with use of respective different serial numbers for the software 300 at the old version and the software 300 at the new version, the license for the software 300 at the old version, which is no longer necessary, can be reused by being moved into another computer. When the license is planned to be used on another computer, the license for the old version should be returned.

Now, the return of the license will be described specifically. The return of the license refers to transmission of request data for the license return from the license management module 302 to the license management software 310. The information in the license table 500 managed in the license storage unit 303 is contained in the request data. The license management software 310 collates the returned license based on this information, and releases the association with the serial number by deleting the corresponding client device information 606 from the license table 600 managed in the license management unit 311. The information in the license table 500 managed in the license storage unit 303 is assumed to be deleted, and this deletion prohibits the software 300 at the old version from being started up because of the lack of the information in the license table 500 at the time of the startup.

Then, if the licenses are acquired for the plurality of versions with use of the single serial number, all of the licenses associated with the serial number should be returned. This return allows the licensing server 120 to release the respective associations among the serial numbers 601, the pieces of software identification information 604, and the pieces of client device information 606 managed by the licensing server 120, thereby allowing the serial number to be used on another computer.

Now, the processing according to the present exemplary embodiment will be described as an example that carries out the license return at the same time when carrying out the license activation according to the state of the held license so that a plurality of unnecessary licenses held by the client 110 can be returned.

Figure 8:
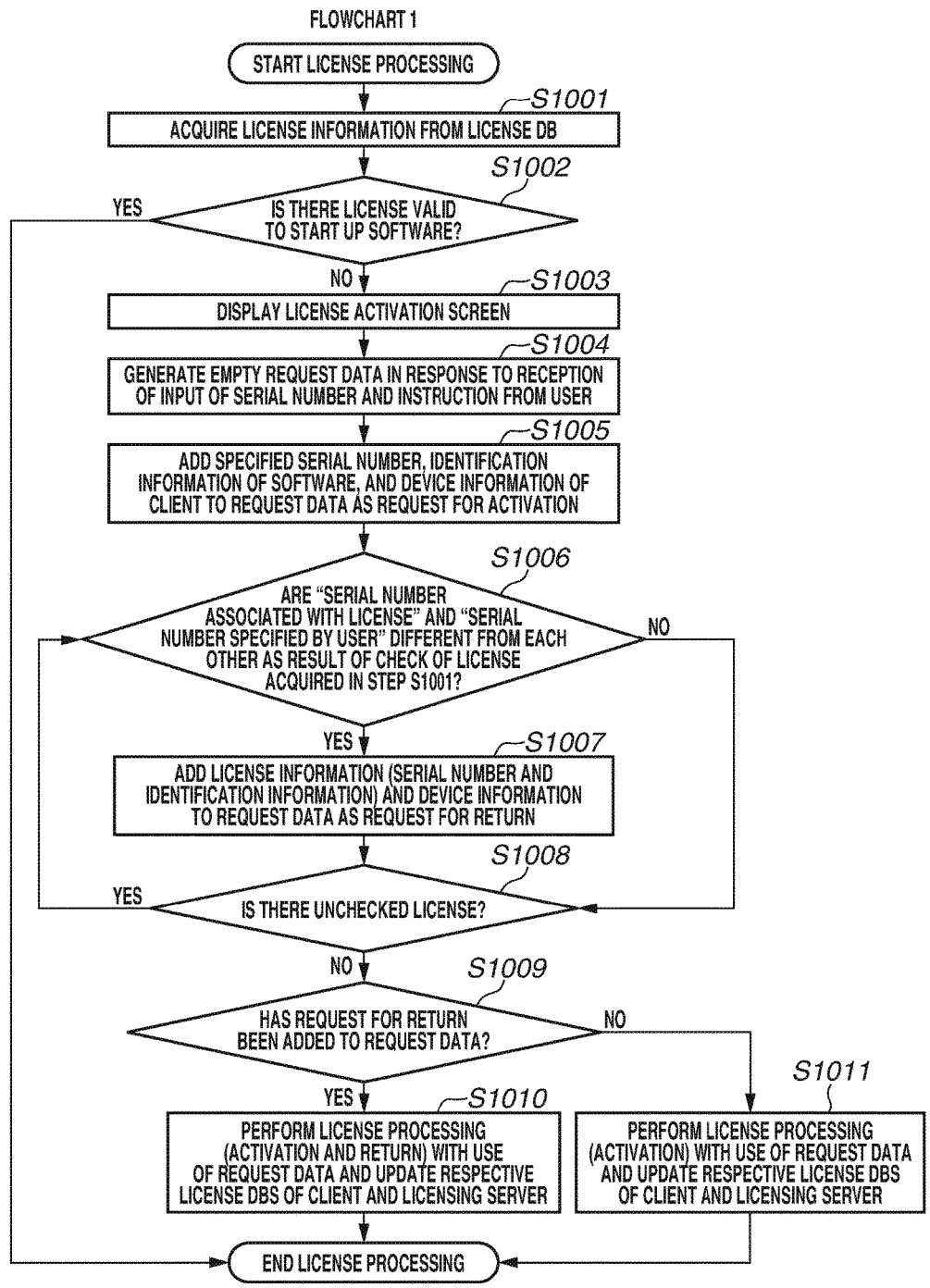
FIG. 8 is a flowchart illustrating processing according to an exemplary embodiment of the present invention.

FIG. 8 is a flowchart illustrating processing of the software 300. A flow of the processing will be described, referring to the software 300 that runs on the client 110 illustrated in FIG. 1 by way of example. The present flow indicates a method for efficiently returning the unnecessary license remaining in the client 110 when the software 300 is upgraded. This method is characterized in that the client 110 checks the state of the license by performing each determination step, and returns the license as a result of the check.

Upon a start of processing for starting up the software 300, in step S1001, the license management module 302 acquires the license information list from the license storage unit 303. Next, in step S1002, the license management module 302 determines whether there is the license valid to start up the software 300 in the license information acquired in step S1001. The valid license in this case refers to such license that the identification information of the software 300 to be started up and the software identification information 604 associated with the license match each other. If there is the valid license in the acquired license information (YES in step S1002), the processing is ended. If there is not the valid license in the acquired license information (NO in step S1002), the processing proceeds to step S1003. The software identification information 604 in this case is the information for determining whether to permit the startup of the software 300, and this information is held by the software 300. For example, if the software 300 holds the software identification information "C100" and the software identification information 604 associated with the license is "C100", the license management module 302 determines that the pieces of software identification information match each other.

Next, in step S1003, the license management module 302 displays the license activation software 301 (the license activation screen 400). Next, in step S1004, the license management module 302 generates the request data for the license processing in response to reception of the input of the serial number and an instruction for the license activation from the license activation software 301.

Next, in step S1005, the license management module 302 adds the serial number, the identification information of the software 300, and the device information of the client 110 to the request data generated in step S1004 as the request for the license processing. Next, in step S1006, the license management module 302 determines whether the serial number 501 associated with the license in the license information acquired in step S1001 and the serial number received in step S1004 are different from each other. If they are different from each other (YES in step S1006), the processing proceeds to step S1007. If they are not different from each other (NO in step S1006), the processing proceeds to step S1008.

Next, in step S1007, the license management module 302 adds the information about the license determined to be associated with the different serial number in step S1006 to the request data generated in step S1004 as a request for the license return. The information about the license in this case refers to the information associated with the license. More specifically, the serial number 501, the software identification information 504, and the client device information 506 correspond to this information. The transmission of the request for the license return to the licensing server 120 is referred to as the return as described above, and leads to the release of the association between the serial number 601 and the device information 606 in the licensing server 120. The information about the license contained in the request for the license return transmitted when the license is returned is not limited to the first exemplary embodiment.

In step S1007, the request data contains therein the information for the license activation using the serial number for the software 300 at the new version and the information for the license return using the serial number 501 used when the license activation has been carried out for the software 300 at the old version. Further, the information for the license return to be added to the request data contains all of the licenses determined to be associated with the different serial number in step S1006.

Next, in step S1008, the license management module 302 determines whether there is a license unprocessed in step S1006. If there is an unprocessed license (YES in step S1008), the processing proceeds to step S1006. If there is no unprocessed license (NO in step S1008), the processing proceeds to step S1009. Repeating the processing from step S1006 to step S1008 allows the client 110 to return another license than the license already set as a return target and corresponding to the different serial number. As a result, the returned license becomes usable on another personal computer (PC).

Now, the flow from step S1006 to step S1008 will be described specifically. For example, in FIG. 5, the client 110 (0000AAAA2222) acquires the licenses for the two software names 502 (the software 100 and the software 400) with use of the serial number 501 (1111-1111-1111-0001). The client 100 acquires these licenses in the following manner. First, the client 110 acquires the license for the software 100 with use of the serial number 501 (1111-1111-1111-0001) after the software 100 is installed. Next, the client 110 acquires the license for the software 400 with use of the same serial number 501 (1111-1111-1111-0001) as the previously used serial number after the software 100 is upgraded to the software 400. At the time of the acquisition of the license for the software 400, step S1007 is skipped because the two serial numbers are determined not to be different from each other in step S1006. As a result, the license information of the software 100 is not added to the request for the return and the request data.

Further, if using the serial number (1111-1111-1111-0001) when upgrading the software 400 to the software 500 from this state and acquiring the license therefor, the client 110 can acquire three licenses with use of the single serial number. On the other hand, if the client 110 uses another serial number 501 (5555-5555-5555-0001), the serial numbers of the software 100 and the software 400 are determined to be different serial numbers in step S1006, whereby the loop processing from step S1006 to step S1008 causes the license information of the software 100 and the license information of the software 400 to be added to the request data as the request for the return. It should be noted that the license information containing the software identification information 504 "C100P (a software extended function 100)" is stored in the license table 500, but the description of the first exemplary embodiment will continue assuming that this license information is not stored in the license table 500.

Next, in step S1009, the license management module 302 determines whether the process in step S1007 has been performed. If the process in step S1007 has been performed (YES in step S1009), the processing proceeds to step S1010. If the processing in step S1007 has not been performed (NO in step S1009), the processing proceeds to step S1011.

In step S1010, the license management module 302 performs the processing for the license activation and the processing for the license return at the same time with use of the request data generated in the present flow. The license management software 310 on the licensing server 120 that has received the above-described processing updates the database 600 (the license management unit 311) based on the received request data. More specifically, for the license activation, the license management software 310 associates the information for the license activation (the serial number 601, the software identification information 604, and the client device information 606) that is contained in the request data with the license to be issued to the client 110. Further, for the license return, the license management software 310 releases the association of the information for the license return (the serial number 601, the software identification information 604, and the client device information 606) that is contained in the request data with the license information registered in the database 600. In other words, the license management software 310 deletes the corresponding license information from the database 600. Further, the license management module 302 stores the acquired license into the license storage unit 303, and deletes the returned license from the license storage unit 303.

In step S1011, the license management module 302 performs the processing for the license activation with use of the request data generated in the present flow. The operation performed in step S1011 is similar to the operation regarding the license activation performed in step S1010, and therefore a description thereof will be omitted here.

In this way, the client 110 can return the plurality of licenses that is no longer necessary at the same time during the series of processes for the license activation according to the state of the held license. Further, conventionally, the return of the license has required the return operation to be performed as many times as the number of licenses to be returned. However, the present exemplary embodiment allows the client 110 to return the plurality of licenses at the time of the license activation, thereby eliminating the necessity of the return operation itself.

[Processing of Software According to Second Exemplary Embodiment]

The above-described first exemplary embodiment has been described as the method that returns the unnecessary license held by the client 110 at the same time as the license activation. However, the employment of only the above-described first exemplary embodiment still leaves such a problem that the license is returned undesirably even when the license should not be returned.

Now, this problem will be described specifically. If another serial number than the serial number used in the license activation for the software 300 is used when the license activation is carried out for add-in software including the software extended function 304, the first exemplary embodiment results in the undesirable return of the license for the software 300. In other words, the first exemplary embodiment raises a problem of making the startup of the software 300 impossible because bringing the license storage unit 303 into a state only holding the license for the software extended function 304 despite the software 300 actually installed in the client 110.

Therefore, a second exemplary embodiment will be described as a method including refraining from returning the license for the software main body 300 when carrying out the license activation for the software extended function 304, in addition to the method according to the first exemplary embodiment. The present exemplary embodiment will be described, omitting descriptions of similar features of the present exemplary embodiment to those of the first exemplary embodiment, such as the system configuration and the UI of the application.

Figure 9:
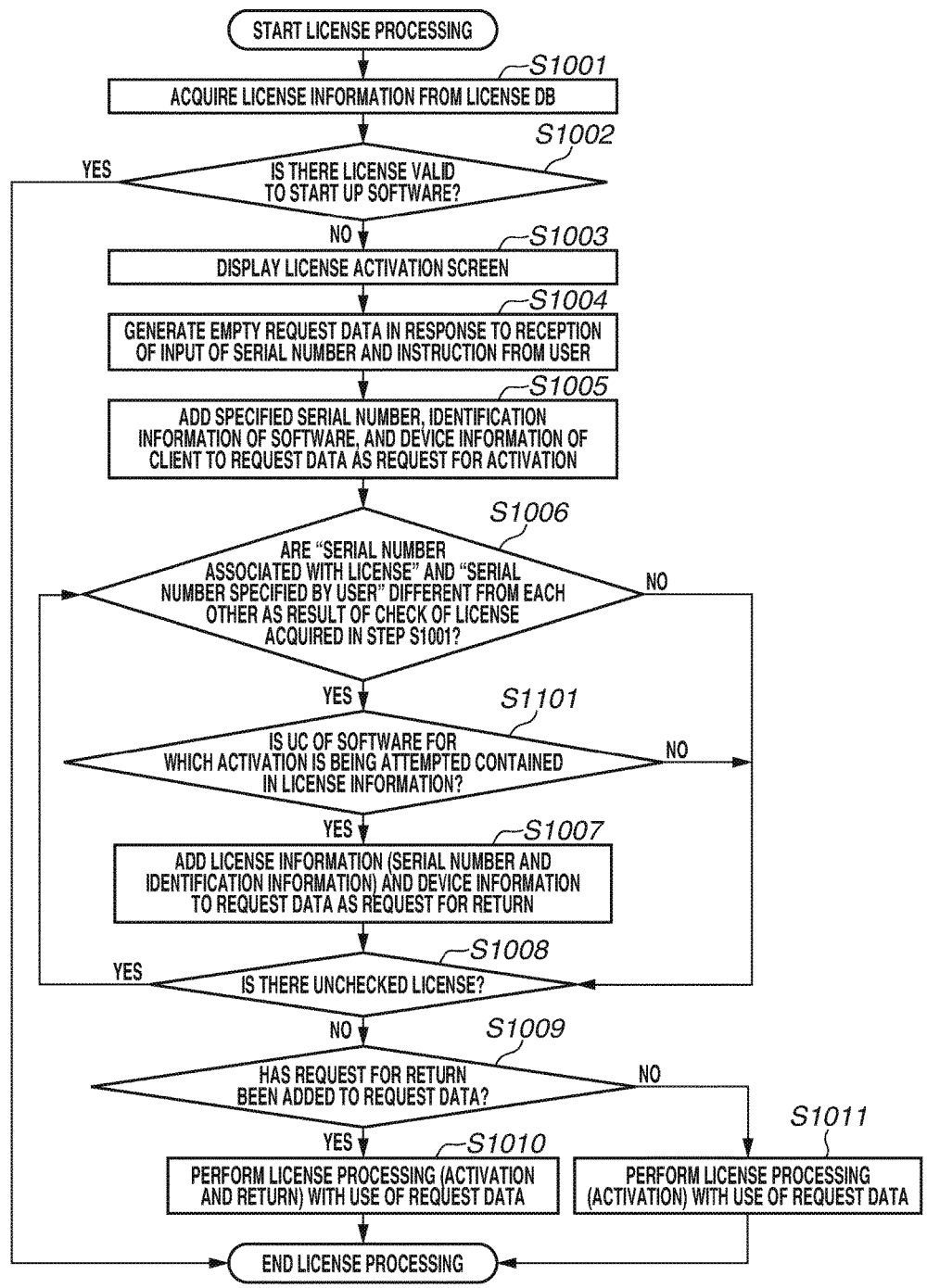
FIG. 9 is a flowchart illustrating processing according to an exemplary embodiment of the present invention.

FIG. 9 is a flowchart illustrating processing of the software extended function 304. A flow of the processing will be described, referring to the software extended function 304 that runs on the client 110 illustrated in FIG. 1 by way of example. The present flow indicates a method that determines the license unnecessary to be returned and does not return this license when carrying out the license activation for the software extended function 304 with the license already acquired for the software 300. This method is characterized in that the client 110 checks the state of the license by performing each determination step, and returns the license as a result of the check.

In the present exemplary embodiment, FIG. 9 will be described, omitting descriptions about portions overlapping those in FIG. 8.

In step S1101, the license management module 302 determines whether the upgrade code of the software 300 for which the license activation is being attempted is contained in the license information acquired in step S1001. If this upgrade code is contained in the acquired license information (YES in step S1101), the processing proceeds to step S1007. If this upgrade code is not contained in the acquired license information (NO in step S1101), the processing proceeds to step S1008.

Now, step S1101 will be described specifically. The license information acquired in step S1001 in the present case corresponds to, for example, the license information in the license table 500 that contains the software identification information 504 "C100" of the software main body 300 for which the license has been already acquired. The respective pieces of license information containing the pieces of software identification information 504 "C400 (the software 400) and C100P (the software extended function 100)" are stored in the license table 500, but the description of the second exemplary embodiment will continue assuming that they are not stored in the license table 500. Further, the software 300 for which the license activation is being attempted in this case corresponds to, for example, the software extended function 304 appended to the software main body 300. The UC 505 ({11111111-FFFF-FFFF-FFFF-FFFF11111111}) contained in the license information is the information associated with the license when the license is issued by the license management software 310, and is used by the license management module 302 in the determination processing according to the present exemplary embodiment. In the present case, the software identification information 504 (C100), the client device information 506 (0000AAAA2222), the serial number 501 (1111-1111-1111-0001), and the software UC 505 ({11111111-FFFF-FFFF-FFFF-FFFF11111111}) are contained in the license information.

In step S1007, the license information to be added to the request data as the request for the return is determined in the following manner according to the determinations in steps S1006 and S1101. Step S1006 allows the client 110 to determine that the license information in the license table 500 to be set as the return target is associated with the different serial number from the serial number of the software 300 for which the license activation is being attempted. More specifically, the client 110 can determine that the license information to be set as the return target is the license information associated with the different serial number, if the serial number 501 (1111-PPPP-PPPP-0000) of the software extended function 304 for which the activation is being attempted is not contained in the license associated with "C100".

The operation in step S1101 allows the client 110 to determine that the license information in the license table 500 to be set as the return target is associated with the different UC as the UC of the software 300 for which the license activation is being attempted. More specifically, the client 110 can determine that the license information belongs to software that is a different product from the software 300 for which the activation is being attempted, if the UC 505 ({77777777-AAAA-AAAA-AAAA-AAAA77777777}) of the software extended function 304 for which the activation is being attempted is not contained in the license information associated with "C100". In other words, the client 110 can determine that the license information is the license information (C100) of the software 300 when attempting to carry out the license activation for the software extended function 304.

These determinations prevent the client 110 from returning the license issued based on the different serial number if the same upgrade code as the software for which the license activation is being attempted is not contained in the license information, even when the compared two serial numbers are different from each other.

In this way, the second exemplary embodiment allows the client 110 to avoid unintentional license return with respect to the integrated software 300 that functions based on the plurality of licenses. In the second exemplary embodiment, the software UC 505 has been cited as an example of the information in the license information that is compared with the software 300 for which the license activation is being attempted, but the information to be compared with the software 300 shall not be limited to the above-described UC 505.

[Processing of Software According to Third Exemplary Embodiment]

In the above-described second exemplary embodiment, the method has been described in which it is determined whether the license return can be carried out with respect to the integrated software 300 that functions based on the plurality of licenses. However, the employment of only the above-described second exemplary embodiment raises such a problem that the unnecessary license remains in the client 110 when the installed software extended function 304 is inoperable.

Now, this problem will be described specifically. Generally, the software extended function 304 addable to the software 300 is defined about which version the software extended function 304 supports regarding the version of the software 300. Further, similarly, the software 300 is also defined about which version the software 300 supports regarding the version of the software extended function 304. For example, if the software 300 is upgraded with the respective licenses for the software 300 and the software extended function 304 stored in the license storage unit 303, this upgrade results in coexistence of the license for the software 300 at the new version and the license for the software extended function 304 at the old version. In this case, if the software 300 at the new version does not support the software extended function 304 at the old version, the license for the software extended function 304 at the old version that is stored in the license storage unit 303 is unnecessary on the client 110. However, the second exemplary embodiment causes the client 110 to determine not to carry out the license return if the UC 506 of the software 300 for which the activation is being attempted is not contained in the license information, thereby raising a problem of being unable to return the unnecessary license even when carrying out the license activation.

Therefore, a third exemplary embodiment will be described as a method including returning the license for a function unsupported by the software 300 for which the activation is being attempted, in addition to the method according to the second exemplary embodiment. The present exemplary embodiment will be described, omitting descriptions of similar features of the present exemplary embodiment to the second exemplary embodiment, such as the system configuration and the UI of the application.

Figure 10:
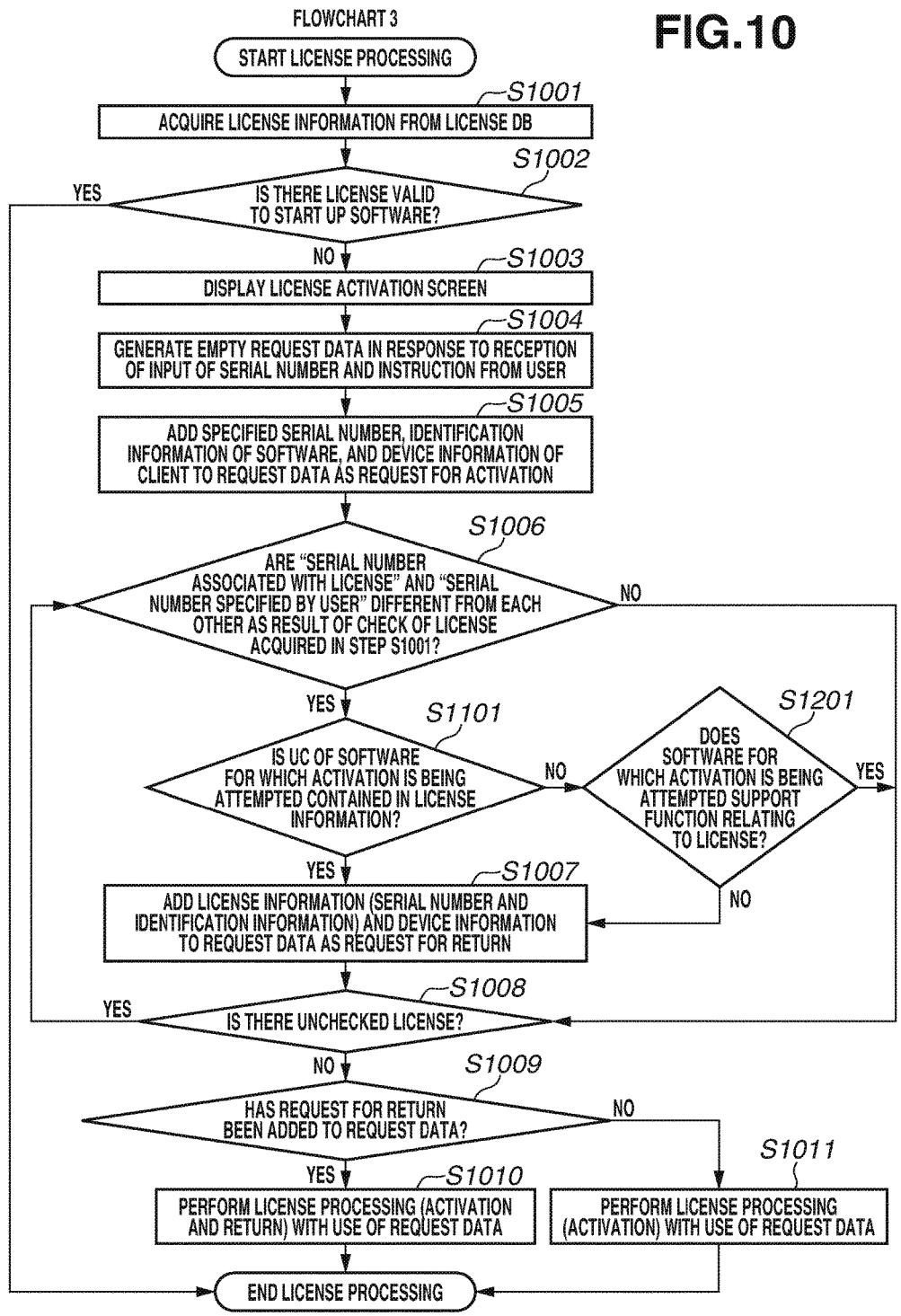
FIG. 10 is a flowchart illustrating processing according to an exemplary embodiment of the present invention.

FIG. 10 is a flowchart illustrating processing of the software 300. A flow of the processing will be described, referring to the software 300 that runs on the client 110 illustrated in FIG. 1 by way of example. This flow indicates a method that returns the unnecessary license for the software extended function 304 if there is the license for the software extended function 304 unsupported by the software 300 when carrying out the license activation. This method is characterized in that the client 110 checks the state of the license by performing each determination step, and returns the license as a result of the check.

In the present exemplary embodiment, FIG. 10 will be described, omitting descriptions about portions overlapping FIG. 9. In step S1201, the license management module 302 determines whether the software 300 for which the license activation is being attempted supports the function provided by the software associated with the license processed in step S1101. If the software 300 supports this function (YES in step S1201), the processing proceeds to step S1008. If the software 300 does not support this function (NO in step S1201), the processing proceeds to step S1007.

Now, step S1201 will be described specifically. The function relating to the license processed in step S1101 in the present case corresponds to, for example, the function of the software extended function 304. Further, the license management module 302 determines whether the software 300 supports this function by comparing the version of the software extended function 304 supported by the software 300 (the supported plug-in version 703) and the version 503 of the software extended function 304 that is contained in the license information. Further, the license management module 302 acquires the supported plug-in version 703 from the registry information 700 of the currently installed software 300. If these versions 703 and 503 match each other, the license management module 302 determines that the software 300 supports the software extended function 304, and the license management module 302 does not specify the license for the software extended function 304 as the license that is the target for the return in step S1007. On the other hand, if these versions 703 and 503 do not match each other, the license management module 302 determines that the software 300 does not support the software extended function 304, and specifies the license for the software extended function 304 as the license to be returned. For example, in FIG. 7, the supported plug-in version 703 is defined to be "5", while the version 702 of the software extended function 304 is "1". Therefore, the software 300 does not support the installed software extended function 304, so that the software extended function 304 is inoperable. On the other hand, if the version 702 of the software extended function 304 is "5", the software 300 supports the installed software extended function 304, so that the software extended function 304 is operable.

In this way, the third exemplary embodiment allows the client 110 to return the unnecessary license unsupported by the software 300 with respect to the integrated software 300 that functions based on the plurality of licenses.

The above-described third exemplary embodiment has been described as the method that determines whether the return of the unnecessary license can be carried out with respect to the integrated software 300 that functions based on the plurality of licenses. However, the employment of only the above-described third exemplary embodiment still involves such a problem that the client 110 may return the license that actually does not have to be returned.

Now, this problem will be described specifically. For example, if the software 300 is upgraded and the license activation is carried out for the software 300 at the new version with the respective licenses for the software 300 and the software extended function 304 stored in the license storage unit 303, the following problem arises.

In the above-described case, the license for the software 300 at the old version is returned if the serial number used in the license activation for the software 300 at the old version and the serial number used in the license activation for the software 300 at the new version are different from each other in step S1101. Further, the license for the software extended function 304 at the old version is not returned if the software 300 at the new version supports the software extended function 304 at the old version in step S1201. These two processing procedures are performed even if the serial number contained in the license information of the software 300 at the old version and the serial number contained in the license information of the software extended function 304 at the old version are not different from each other.

As described in the first exemplary embodiment, if the plurality of licenses is acquired with use of the single serial number, this serial number cannot be used on another computer unless all of the licenses having the pieces of license information associated with the same serial number are returned. In other words, not returning the license for the software extended function 304 at the old version also eliminates the necessity of returning the license for the software 300 at the old version. However, the third exemplary embodiment raises such a problem that the license is returned despite the unnecessity of returning the license for the software 300 at the old version.

Therefore, a fourth exemplary embodiment will be described as a method including not returning the license that is pointless to return while taking into consideration of the return of the license for the function unsupported by the software 300 for which the license activation is being attempted, in addition to the method according to the third exemplary embodiment. The present exemplary embodiment will be described, omitting descriptions of similar features of the present exemplary embodiment to the third exemplary embodiment, such as the system configuration and the UI of the application.

FIG. 11 (consisting of FIGS. 11A and 11B) is a flowchart illustrating processing of the software 300. A flow of the processing will be described, referring to the software 300 that runs on the client 110 illustrated in FIG. 1 by way of example. This flow indicates a method that inspects the license that is the return target and carries out the license return while taking into consideration of the license information in the license storage unit 303 when carrying out the license activation. This method is characterized in that the client 110 checks the state of the license by performing each determination step, and returns the license as a result of the check.

In the present exemplary embodiment, FIG. 11 will be described, omitting descriptions about portions overlapping FIG. 10. In step S1301, the license management module 302 determines whether the number of pieces of license information acquired in step S1001 is one. If the determined answer is YES (the number is one) (YES in step S1301), the processing proceeds to step S1007. If the number is two or more (NO in step S1301), the processing proceeds to step S1302.

In step S1302, the license management module 302 performs processing for comparing the pieces of license information acquired in step S1001. Now, the license used in the determination made in step S1006 is defined to be a license A, and the license used in the comparison processing performed in step S1302 is defined to be a license B. In step S1302, the license management module 302 determines whether the serial number 501 in the license information of the license A and the serial number 501 in the license information of the license B are different from each other. If these serial numbers 501 are different from each other (YES in step S1302), the processing proceeds to step S1305. If these serial numbers 501 are not different from each other (NO in step S1302), the processing proceeds to step S1303.

Now, step S1302 will be described specifically. In step S1302, the license management module 302 determines whether the license A is a license that can bring about a beneficial effect by being returned, by comparing the two serial numbers 501. Step S1101 allows the client 110 to determine that the license A is the license for the software 300 at the old version because the license A holds the software UC 505. Then, step S1302 allows the client 110 to determine that the license A is the license that can bring about a beneficial effect by being returned because the license for the software 300 at the old version can be used on another computer, if the license A is different from the license B in terms of the serial number 501. However, because every one of the licenses acquired in step S1001 corresponds to the license B that is compared with the license A, existence of even only one serial number 501 that matches the license A necessitates further determinations in step S1303 and subsequent steps.

In step S1303, the license management module 302 determines whether the UC 505 of the software 300 for which the license activation is being attempted is contained in the license information of the license B. If this UC 505 is contained in the license information of the license B (YES in step S1303), the processing proceeds to step S1305. If this UC 505 is not contained in the license information of the license B (NO in step S1303), the processing proceeds to step S1304.

Now, step S1303 will be described specifically. In step S1303, the license management module 302 determines which license the license B is, the license for the software 300 at the old version or the license for the software extended function 304 at the old version. The license management module 302 can determine that the license B is the license for the software 300 at the old version if the upgrade code 505 of the software 300 is contained in the license information of the license B (YES in step S1303), and can determine that the license B is the license for the software extended function 304 at the old version if the upgrade code 505 of the software 300 is not contained in the license information of the license B (NO in step S1303).

In step S1304, the license management module 302 determines whether the software 300 for which the license activation is being attempted supports the function of the license B. If this software 300 supports the function of the license B (YES in step S1304), the processing proceeds to step S1008. If this software 300 does not support the function of the license B (NO in step S1304), the processing proceeds to step S1305. A method for determining whether the software 300 supports the function of the license B at this time is similar to step S1201, whereby a description thereof will be omitted here.

Now, step S1304 will be described specifically. In step S1304, the license management module 302 determines whether the software 300 at the new version supports the software extended function 304 at the old version. If the software 300 at the new version supports the software extended function 304 at the old version (YES in step S1304), the license having the same serial number 501 as the software extended function 304 at the old version can be determined to be the license that can bring about no beneficial effect even if being returned.

Next, in step S1305, the license management module 302 determines whether there is the license B unprocessed in step S1302. If there is the unprocessed license B (YES in step S1305), the processing proceeds to step S1302. If there is not the unprocessed license B (NO in step S1305), the processing proceeds to step S1007.

In this way, the fourth exemplary embodiment allows the client 110 to determine and return only the license that can bring about a beneficial effect by being returned according to the state of the license held by the client 110 with respect to the integrated software 300 that functions based on the plurality of licenses.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-138116, filed Jul. 9, 2015, which is hereby incorporated by reference herein in its entirety.

What is claimed is:

1. An information processing apparatus configured to control an operation of software based on an issued license, the information processing apparatus comprising:

at least one processor; and
at least one memory storing instructions that, when executed, cause the at least one processor to operate as:
a holding unit configured to hold a serial number input to issue a first license for controlling the operation of the software;
a reception unit configured to receive an input of a serial number required to issue a second license for controlling the operation of the software at a different version;
a checking unit configured to check whether the serial number corresponding to the first license held by the holding unit and the serial number received by the reception unit are different from each other; and
a control unit configured to control the software based on the second license issued by a licensing server based on the serial number received by the reception unit along with returning the first license to the licensing server, if the checking unit confirms that the serial number corresponding to the first license held by the holding unit and the serial number received by the reception unit are different.

2. The information processing apparatus according to claim 1, wherein the control unit does not return the first license to the licensing server if the checking unit confirms that the serial number corresponding to the first license held by the holding unit and the serial number received by the reception unit are the same.

3. The information processing apparatus according to claim 1, wherein the control unit returns a license that is a license other than the first license held by the holding unit, the other license being issued by the licensing server based on a same serial number from the serial number received by the reception unit and already held by the holding unit, together with the first license to the licensing server, if the checking unit confirms that the serial number corresponding to the first license that is held by the holding unit and the serial number received by the reception unit are different from each other.

4. The information processing apparatus according to claim 1, wherein the checking unit further checks whether product information contained in the first license and product information of the software that operates under the control based on the second license are different from each other, the further check being performed if the checking unit confirms that the serial number corresponding to the first license and the serial number received by the reception unit are different,
wherein the control unit returns the first license to the licensing server if the checking unit confirms that the product information contained in the first license and the product information of the software that operates under the control based on the second license are the same,
wherein the control unit does not return the first license to the licensing server, if the checking unit confirms that the product information contained in the first license and the product information of the software that operates under the control based on the second license are different, and
wherein the product information is information assigned in such a manner that common information is assigned to same software applications at different versions.

5. The information processing apparatus according to claim 4, wherein the checking unit further checks whether the software that operates under the control based on the second license supports the software that operates under the control based on the first license if the checking unit confirms that the product information contained in the first license and the product information of the software that operates under the control based on the second license are different from each other, wherein the control unit returns the first license to the licensing server if the checking unit confirms that the software that operates under the control based on the second license does not support the software that operates under the control based on the first license, and wherein the control unit does not return the first license to the licensing server if the checking unit confirms that the software that operates under the control based on the second license supports the software that operates under the control based on the first license.

6. The information processing apparatus according to claim 4, wherein, if the checking unit confirms that the product information contained in the first license and the product information of the software that operates under the control based on the second license are the same, the control unit returns the first license if the checking unit confirms that the software that operates under the control based on the second license does not support software that operates under control based on a third license that is issued based on a same serial number as the first license and contains different product information from the product information of the first license, and the control unit does not return the first license, if the checking unit confirms that the software that operates under the control based on the second license supports the software that operates under the control based on the third license.

7. The information processing apparatus according to claim 1, wherein the software that operates under the control based on the second license is add-in software for extending a function of the software that operates under the control based on the first license.

8. A method to be performed by an information processing apparatus configured to control an operation of software based on an issued license, the method comprising:

holding a serial number input to issue a first license for controlling the operation of the software;

receiving an input of a serial number required to issue a second license for controlling the operation of the software at a different version;

checking whether the serial number corresponding to the held first license and the received serial number are different from each other; and controlling the software based on the second license issued by a licensing server based on the received serial number along with returning the first license to the licensing server, if it is confirmed that the serial number corresponding to the held first license and the received serial number are different from each other.

9. A non-transitory storage medium storing a program to be executed by an information processing apparatus configured to control an operation of software based on an issued license to perform a method, the method comprising:

holding a serial number input to issue a first license for controlling the operation of the software;

receiving an input of a serial number required to issue a second license for controlling the operation of the software at a different version;

checking whether the serial number corresponding to the held first license and the received serial number are different from each other; and controlling the software based on the second license issued by a licensing server based on the received serial number along with returning the first license to the licensing server, if it is confirmed that the serial number corresponding to the held first license and the received serial number are different from each other.

\* \* \* \* \*